United States Patent
Watthanasintham

(10) Patent No.: US 7,294,789 B1
(45) Date of Patent: Nov. 13, 2007

(54) RETAINER WITH BAND CLIP AND CABLE HOLDER

(75) Inventor: Malaythip Watthanasintham, South Haven, MI (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 11/397,610

(22) Filed: Apr. 5, 2006

(51) Int. Cl.
*H02G 3/04* (2006.01)

(52) U.S. Cl. .................. 174/135; 174/68.1; 174/64; 174/154; 174/157; 248/68.1; 385/135

(58) Field of Classification Search ............. 174/68.1, 174/60, 64, 135, 99 R, 109, 154, 157, 72 A, 174/503; 248/68.1, 74.1, 214, 74.5, 547; 385/135
See application file for complete search history.

(56) References Cited

U.S. PATENT DOCUMENTS

| | | |
|---|---|---|
| 2,613,051 A | 10/1952 | Baum |
| 4,997,147 A | 3/1991 | Velke, Sr. et al. |
| 5,131,613 A | 7/1992 | Kamiya et al. |
| 5,669,590 A | 9/1997 | Przewodek |
| 6,354,545 B1 * | 3/2002 | Liao ............... 248/214 |
| 6,409,131 B1 | 6/2002 | Bentley et al. |
| 6,581,884 B1 * | 6/2003 | Gretz ............... 248/74.1 |
| 7,207,528 B2 * | 4/2007 | Kato ............... 248/55 |

* cited by examiner

*Primary Examiner*—Dhiru R. Patel
(74) *Attorney, Agent, or Firm*—Daniel R. Edelbrock

(57) ABSTRACT

A one-piece retainer has a base with an integral band clip and a fastener for securing an electrical cable or wire harness to a vehicle component, as well as a pair of arms for supporting another cable or a hose on the component. The base has a cradle extending along a length of the base. The arms extend from each end of the base outward from the cradle. The arms have curved sections creating interior spaces aligned with and spaced away from the cradle. Ledges extend from the base opposite each arm, forming an opening to each interior space between the ledge and a tapered edge of the curved section of the arm. The openings face in opposite directions. A cable or hose is twisted or turned relative to the base such that part of the cable or hose can be rested on the ledges in alignment with each opening. Then the cable or hose is twisted or turned back and inserted or snapped into the interior of each arm to seat along the cradle. The arms resiliently clasp the cable or hose in the cradle.

19 Claims, 4 Drawing Sheets

RETAINER WITH BAND CLIP AND CABLE HOLDER

BACKGROUND OF THE INVENTION

1. Field of the Invention

The invention relates in general to clips for securing electrical cables to vehicle panels, and more particularly to a retainer that includes a band clip and a separate holder for an additional cable or hose.

2. Discussion of Related Art

Cable ties or band clips are typically used in vehicle wiring systems to secure wire bundles or harnesses at specific locations in the vehicles along the routes of the harnesses. A fastener attached to the tie or clip is often pushed into an aperture in a vehicle bulkhead or panel after the tie or band is wrapped around the harness. An example of this type of clip is described in U.S. Pat. No. 5,131,613.

Sometimes it is necessary to secure other cables or hoses along the length of, or part of the length of, the same route in a compact arrangement. Many of these cables or hoses should not be used with ties or bands that might crimp or otherwise damage the cable or hose, so a holding feature separate from the band clip is needed. Placing additional apertures in the vehicle panels for separate clips raises manufacturing costs and can weaken the structural integrity of the panel. In addition, using a larger number of clips increases assembly and material costs.

U.S. Pat. No. 5,669,590 discloses a retaining clip with multiple clamps. In one embodiment, a fastener attached to a first clamp is used to secure the retaining clip to a vehicle panel. The first clamp closes around a wire harness used, for example, to provide power to electrical components near a brake. A second clamp is connected to the first clamp by an integral link member and closes around a hose providing brake fluid to the brake. Regardless of how well such clamps work, vehicle manufacturers often require the use of band clips for securing wire harnesses. Furthermore, while reliable for many uses, the clamps use plastic snap latches that are not suitable for some environments. Overly high insertion forces and low or poor retention forces are issues that arise when using other types of conventional clamp arms. It would seem to be beneficial in the art to have an alternative solution.

SUMMARY OF THE INVENTION

Accordingly, it is an object of this invention to provide a band clip in combination with a holder for securing an additional cable or hose to a component.

Another object of the invention is to form the holder integral with the band clip to provide a one-piece, compact retainer.

A further object of the invention is to arrange clasps of the holder relative to a cable or hose seat such that the additional cable or hose is relatively easy to insert into the holder but is restrained from significant movement.

In carrying out this invention in the illustrative embodiment thereof, a base is attached to a fastener. The fastener is for securing the base to a vehicle panel or bulkhead. The base has a cradle for providing a curved seat or rest to a cable or hose. A band extends from the base for wrapping around at least one electrical cable or wire harness. A slot and inner latch within the base between the fastener and cradle receives part of the band and locks the band at a length needed to tie the harness to the base.

At each end of the base outward from the cradle, a clasp or arm curves around an interior space aligned with the cradle. The arms have openings defined by shaped edges of the arms and by ledges projecting from the base across from each arm. The openings face in opposite directions.

An additional cable or hose is turned or twisted for sequential or simultaneous insertion into each interior space through the openings and then seated on the cradle. An interference fit secures the additional cable or hose in the cradle within the grasps of the arms.

BRIEF DESCRIPTION OF THE DRAWINGS

This invention, together with other objects, features, aspects and advantages thereof, will be more clearly understood from the following description, considered in conjunction with the accompanying drawings.

DETAILED DESCRIPTION OF THE ILLUSTRATED EMBODIMENT

Figure 1:
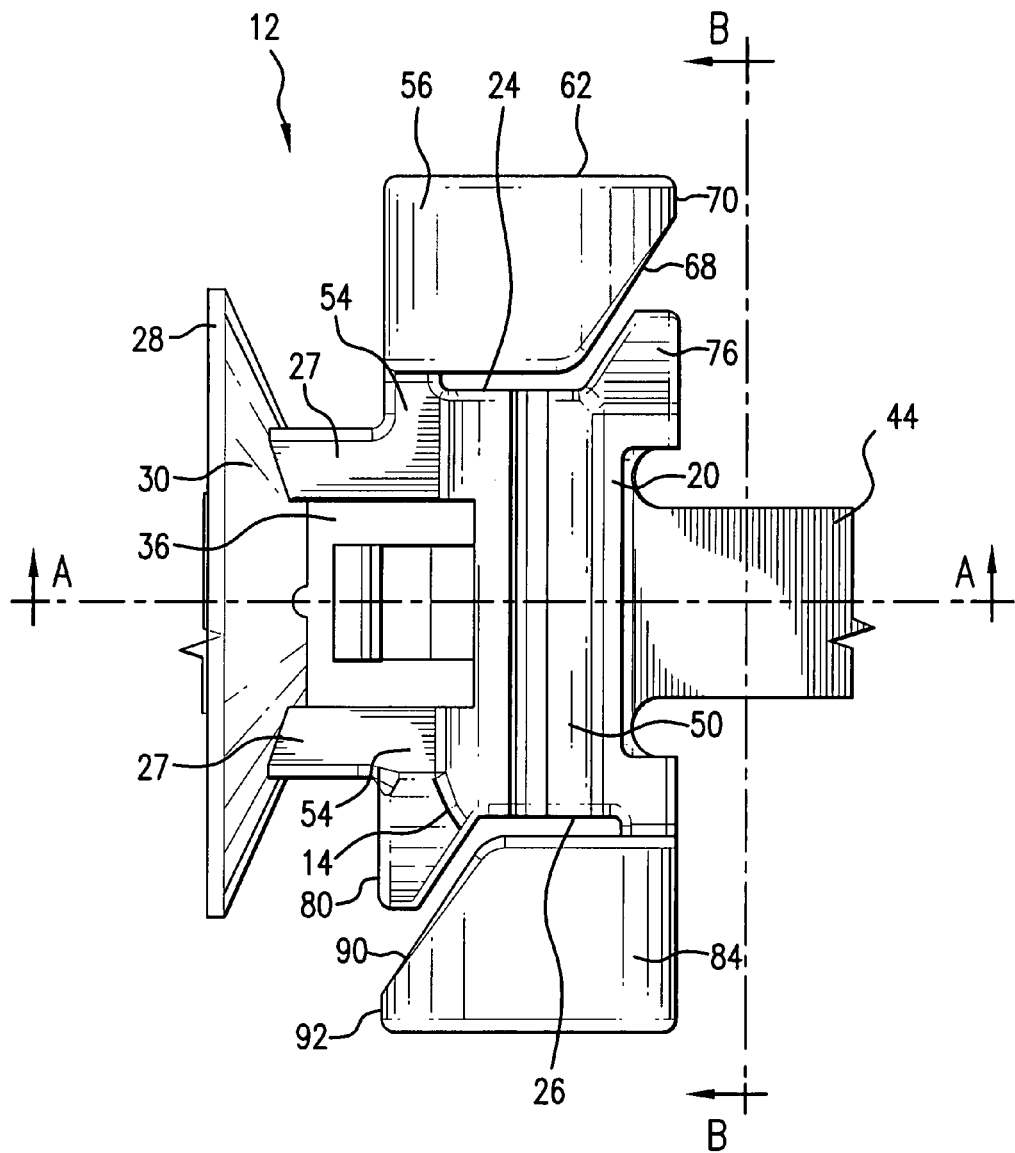
FIG. 1 is an enlarged top view of the combined band clip and cable holder of the present invention.
Figure 2:
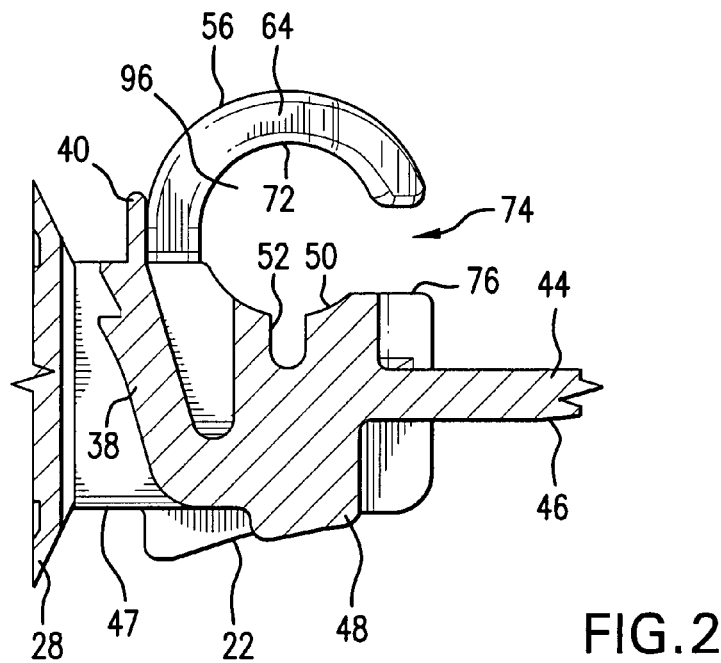
FIG. 2 is a cross-sectional side view taken along section line A-A of FIG. 1.

Referring now to FIGS. 1-5, a unitary retainer 12 including a band clip and a cable or hose holder according to the present invention is illustrated. The retainer would be, for example, injection molded in one piece from an electrically nonconductive, somewhat resilient material such as polypropylene or Nylon.

The retainer 12 has a base 14 with a front surface 16, a rear surface 18, an upper side 20, an underside 22, and two opposite ends or end walls 24 and 26. Supports 27 protrude from the rear surface 18 of the base to join with a circular stabilizing plate 28. The stabilizing plate 28 has the configuration of a shallow bowl. The supports 27 are joined to a convex side 30 of the plate. The plate 28 has a concave side 32, broadly represented in FIG. 3, from which a push-in clip or fastener 34, partially shown in FIG. 5, extends. The fastener 34 is conventional and may be, for example, an arrowhead-type clip or a Christmas-tree-type clip. The fastener 34 is designed to be inserted into an aperture in a vehicle panel (not shown). The concave side 32 of the plate 28 would press against the panel and stabilize the retainer 12.

Figure 3:
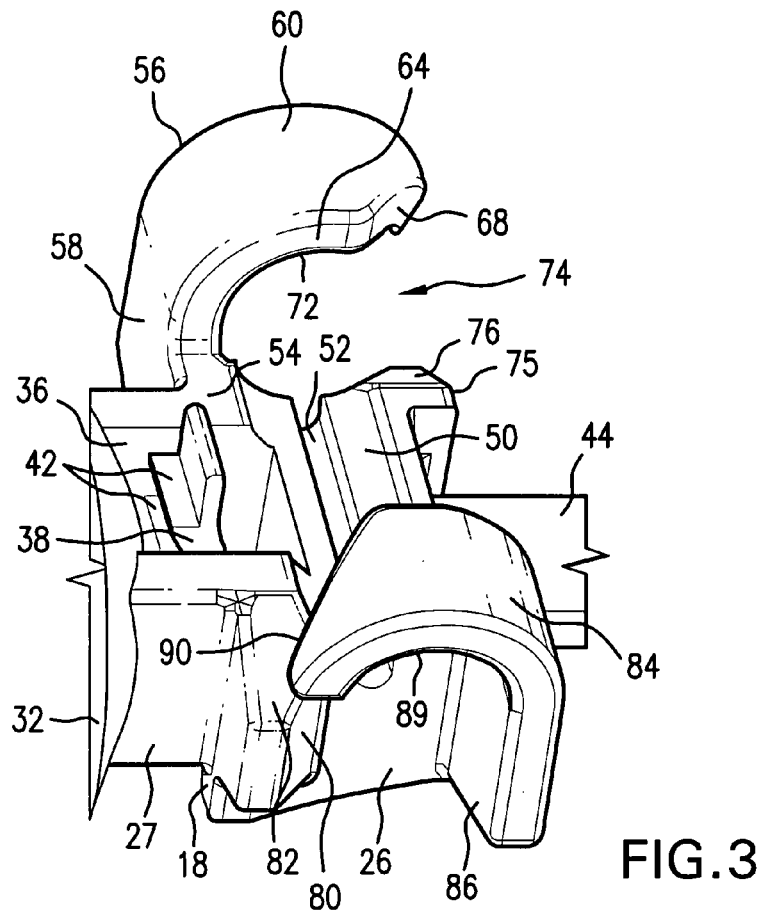
FIG. 3 is an elevated, isometric side view.

There is a slot 36 through the base 14 between the supports 27 and the stabilizing plate 28, as best viewed in FIGS. 1 and 3. A deflectable latch 38 is disposed in the slot 36. The latch 38 extends from the rear surface 18 of the base adjacent the underside 22 to a free end in the form of an operating handle or grip 40 jutting above the slot 36 and the upper side 20 of the base. Snap projections 42, best shown in FIG. 3, are positioned on to face the convex side 30 of the plate 28. The deflectable latch 38 is resiliently biased toward the plate 28. A tie strap or flexible band 44, only partially shown, extends from a central area of the front surface 16 of the base 14. The band itself is conventional and would include teeth on a surface 46 for automatic receipt of the snap projections 42 on the latch 38 when the band is looped around wires or a wire harness and inserted through the slot 36 from the underside 22 of the base 14. The base 14, a flexible band 44, slot 36 and deflectable latch 38 form a band clip 47.

A strut or brace 48 beneath the band 44 where the band joins the base 14 thickens the base at this location to strengthen the connection between the band and base. Providing this brace 48 eliminates the need to make the whole base thicker, reducing the weight of the retainer and decreasing material cost. The band 44 is wrapped around the harness and pulled through the slot 36 to the required or desired length and tightness, bringing the harness toward the underside 22 of the base 14 and against the brace 48. Applying a force on the grip 40 directed away from the plate 28 would release the snap projections 42 from the band teeth and enable the band 44 to be removed from the slot and separated from the wire harness.

The upper side 20 of the base 14 has an inner, longitudinal, curved cable seat or cradle 50 extending from one end wall 24 of the base to the other end wall 26. A central channel or groove 52 in the cradle also extends between the end walls 24 and 26. The cradle 50 is shaped to suspend or hold a cable or hose rested on the curved seat. The groove 52 decreases surface contact between a central area of the cradle 50 and the cable or hose, reducing friction if the cable or hose has to be removed or needs to move longitudinally along the cradle.

Figure 4:
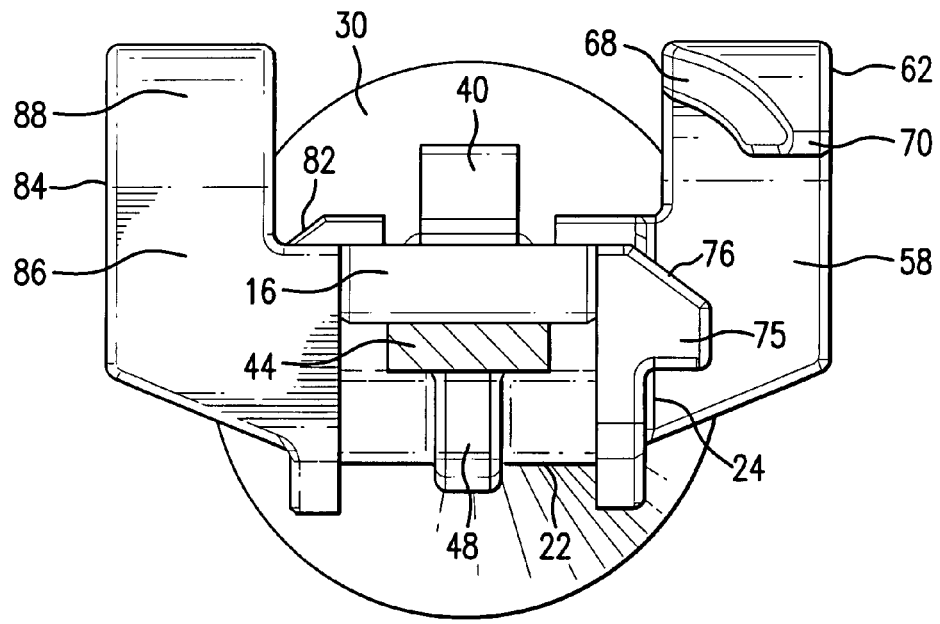
FIG. 4 is cross-sectional front view taken along section line B-B of FIG. 1.
Figure 5:
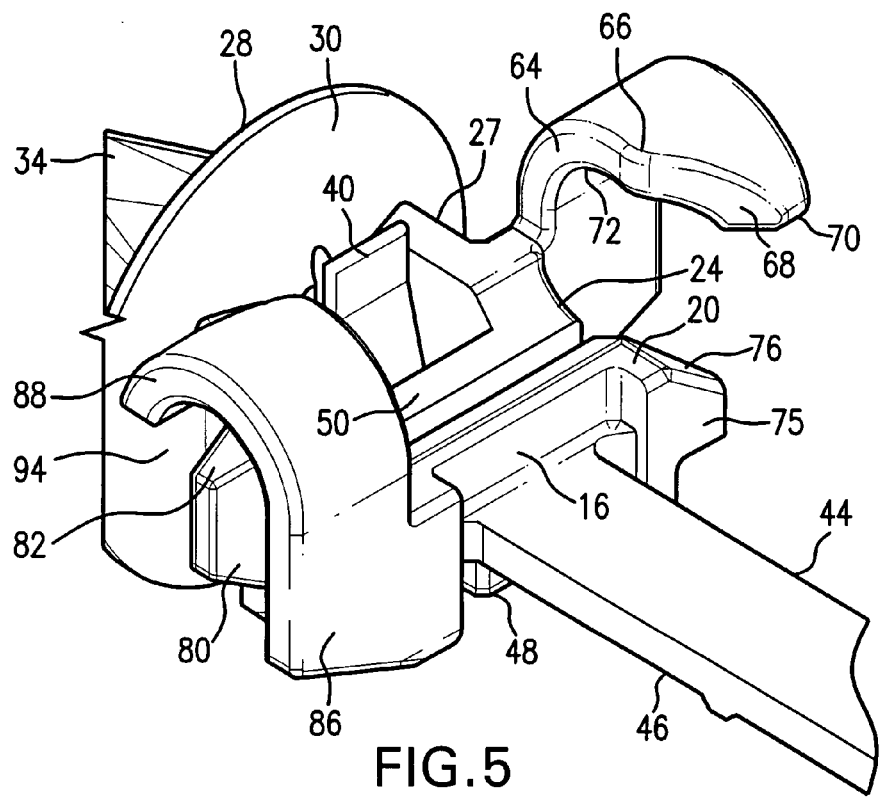
FIG. 5 is an isometric front view.

The upper side 20 of the base 14 merges with the supports 27 through intermediate portions 54. At one end wall 24 of the base, a clasp or arm 56 is joined to the intermediate portion 54. As best shown in FIG. 3, the arm 56 has a straight section 58 joined with the base 14 and a curved section 60 contiguous with the straight section. The curved section 60 is elevated above the upper side 20 of the base outward from the end wall 24, as best illustrated in FIGS. 1, 3 and 5. The arm has an outer edge 62 facing away from the base. The outer edge 62 is generally planar around the entire perimeters of the straight and curved sections. The arm 56 has an inner edge 64 extending up from near the intermediate portion 54. The inner edge 64 is generally in a plane perpendicular to a longitudinal axis of the cradle 50 and extends to a peak or apex 66 (FIG. 5) of the curved section 60. At that location, a tapered edge 68 slants to a distal or free end 70 of the arm 56, narrowing the curved section 60. The free end 70 is relatively short in length, parallel to the cradle, and connects the tapered edge 68 to the outer edge 62, as best illustrated in FIG. 4. All of the edges have beveled or chamfered corners as illustrated to prevent damage to the cable or hose and to reduce insertion obstruction.

The curved section 60 of the arm 56 forms an interior space or area bounded by an inner surface 72. The interior area is accessible through an opening 74, best shown in FIGS. 2 and 3, defined between the tapered edge 68 and the free end 70 of the arm 56 and a shelf or ledge 75 projecting from the end wall 24 adjacent the upper side 20 and front surface 16 of the base. The ledge 75 is essentially a block of material with a top or guide face 76 adjoining the upper side 20 of the base and declining or slanting away from the upper side and narrowing or converging in width in the same direction, as best depicted in FIGS. 1 and 5. This design reduces the insertion force needed to push or snap a cable or hose into the holder, prevents the ledge from snagging or catching on the hose or cable, and simplifies the process of molding the retainer. The guide face 76 is located across the opening 74 from the tapered edge 68. The opening 74 faces in the same general direction as the direction that the band 44 protrudes from the front surface 16 of the base 14.

There are similar features adjacent the other end wall 26 of the base 14. However, these features are arranged in a directly opposed or opposite manner. At the intermediate portion 54, a ledge 80 similar to the ledge 75 projects outward from the end wall 26 of the base. The ledge 80 has a top or guide face 82 slanted or declined and narrowing in width from the intermediate portion 54 outward from the base. On this end or end wall 26 of the base, a clasp or arm 84 substantially identical to the arm 56 extends from the front surface 16 of the base 14. The arm 84 has a straight section 86 contiguous with the base 14 near a junction of the front surface 16 and end wall 26. A curved section 88 of the arm reaches from the straight section 86 toward the ledge 80 and forms an interior space or area bounded by an inner surface 89 (FIG. 3) of the arm. The arm 84 has a tapered inner edge 90 leading to a distal or free end 92, as best shown in FIGS. 1 and 3. An opening 94, best illustrated in FIG. 5, formed between the tapered edge 90 and the free end 92 of the arm 84 and the guide face 82 of the ledge 80 provides access to the interior area. Because of the opposite locations of the ledges and arms on the base, the opening 94 at the end wall 26 faces in a direct opposite direction relative to the opening 74, in the same general direction as the fastener 34. The tapered edges 68 and 90 of the curved sections of each arm lie in substantially parallel planes, as best illustrated in FIG. 1.

The clip strap or band 44 could be used to wrap-around and support, for example, a trunk wire harness for powering a vehicle trunk light and taillights, while the cradle 50 and arms 56 and 84 form a holder 96 that could support a hose for rear-window washer fluid, an antenna cable, or a trunk lid operator cable. The brace 48 keeps the harness spaced from the underside 22 of the base 14 between lower portions of the straight section 86 of the arm 84 and the ledge 75, as best shown in FIG. 4. The base 14 adequately separates the harness from the other cable or hose in the cradle 50. It should also be noted that the retainer of the invention could be useful in various other environments to secure other types of tubular members together and in a particular location.

Figure 6:
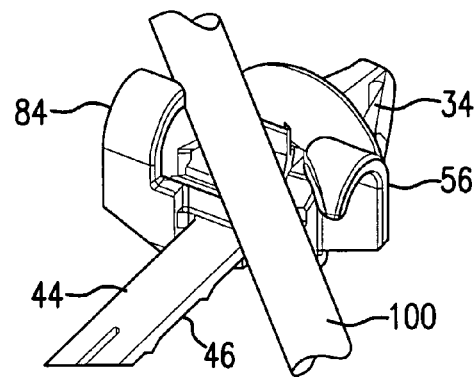
FIG. 6 depicts an initial aligning step for inserting a hose or cable into the holder.
Figure 7:
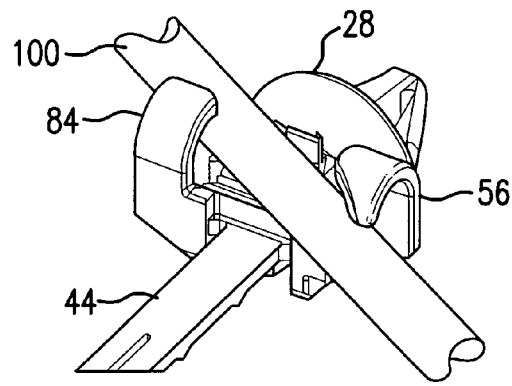
FIG. 7 depicts an intermediate twisting or turning step for inserting a hose or cable into the holder.
Figure 8:
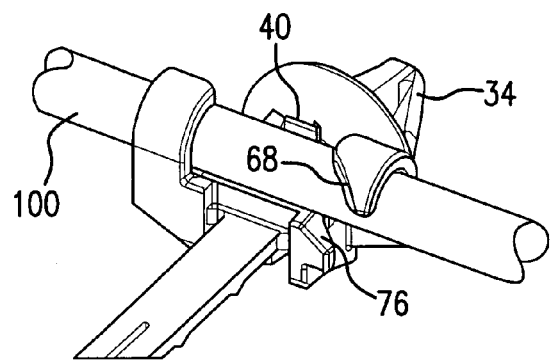
FIG. 8 illustrates the completed assembly of the hose or cable with the holder.

Insertion of a hose or cable 100 into the holder is depicted in FIGS. 6-8. The hose or cable 100 is aligned with the longitudinal axis of the cradle 50 above the clasps or arms 56 and 84. Then the cable or hose is twisted or turned diagonally (FIG. 6) relative to the arms, and lowered (FIG. 7) toward the base 14 to rest on the ledge guide faces 76 and 82. Finally, the hose or cable is twisted or turned back and pushed or snapped through the openings 74 and 94 to seat on the cradle 50 (FIG. 8).

There will be some interference between the cable or hose 100, arms 56 and 84, and guide faces 76 and 82 of the ledges 75 and 80, respectively. The interference is required for reliable support and retention once the cable or hose is installed. On the other hand, the arms are resilient and the insertion force is still relatively low. The retention force exerted on the hose or cable is high, though the cable or hose is still allowed some longitudinal movement relative to the cradle. The invention therefore provides easy cable or hose installation, reliably locking the harness in position on the vehicle while cradling and holding the hose or cable in the required location.

Since minor changes and modifications varied to fit particular operating requirements and environments will be understood by those skilled in the art, this invention is not considered limited to the specific examples chosen for purposes of illustration. The invention is meant to include all changes and modifications which do not constitute a departure from the true spirit and scope of this invention as claimed in the following claims and as represented by reasonable equivalents to the claimed elements.

What is claimed is:

1. A retainer comprising:
   a curved seat having a longitudinal axis, a length extending along the axis between two ends, and a width between two opposite sides;
   a clasp at each end of the seat, the clasps extending from opposite sides of the seat to curve over the longitudinal axis outward from the ends of the seat; and
   a ledge extending outward from each end of the seat on an opposite side of the seat from each arm.

2. The retainer of claim 1 further comprising a groove within the curved seat extending along the longitudinal axis.

3. The retainer of claim 1 wherein each ledge has a face defining an opening with each arm into an interior area aligned with the longitudinal axis of the seat.

4. The retainer of claim 3 wherein each ledge face is slanted away from the seat and narrows in width as the face slants away from the seat.

5. The retainer of claim 1 further comprising a strap extending from under the seat on one side.

6. The retainer of claim 5 further comprising a latch for locking the strap at a required length, the latch being on an opposite side of the seat from the side that the strap extends from.

7. A device for supporting multiple tubular members on a component, the device comprising:
   a band clip for securing at least one tubular member to the component; and
   a holder for mounting an additional tubular member directly on the band clip, the holder including a cradle for the additional tubular member and two clasps for securing the additional tubular member in the cradle, the clasps being aligned with the cradle and having openings facing in opposite directions.

8. The device of claim 7 further comprising guide ledges extending from the cradle in spaced relationship with each clasp opening.

9. A one-piece retainer for securing multiple cables to a component, the retainer comprising:
   a base, the base including a cradle, an underside and two spaced apart ends;
   a band extending from the base between the cradle and the underside of the base;
   a latch within the base for receiving the band and latching the band at a desired length;
   a fastener projecting from the base in an opposite direction relative to the band for attaching the base to the component; and
   two arms, each arm extending from an end of the base and separated from the cradle, the arms each having a curved section with an opening, the openings facing in opposite directions.

10. The one-piece retainer of claim 9 further comprising a ledge extending from each end of the base and across the base from each arm.

11. The one-piece retainer of claim 10 wherein each ledge has a guide face slanting away from the cradle.

12. The one-piece retainer of claim 11 wherein the slanting guide faces narrow in width as they extend away from the base.

13. The one-piece retainer of claim 10 wherein each opening is defined by edges of the curved section and the ledge.

14. The one-piece retainer of claim 13 wherein one of the edges of the curved section is tapered to another of the edges to increase the size of the opening.

15. The retainer of claim 9 wherein each of the arms has a straight section for securing the curved section to the base.

16. The retainer of claim 9 wherein the curved section of each arm has a tapered edge, the tapered edges being in substantially parallel planes.

17. The retainer of claim 9 wherein the latch for receiving and latching the band is a deflectable latch mounted within a slot in the base between the fastener and cradle.

18. The retainer of claim 17 wherein the fastener is attached to a stabilizing plate, and the slot is formed between supports attaching the base to the plate.

19. The retainer of claim 9 wherein the fastener is a push-in type fastener.

* * * * *